A. N. OZIAS, DEC'D.
D. L. FAIRCHILD & R. VAN L. HAXBY, ADMINISTRATORS.
SPRING BALANCE SCALE.
APPLICATION FILED JULY 3, 1912.
1,092,449. Patented Apr. 7, 1914.
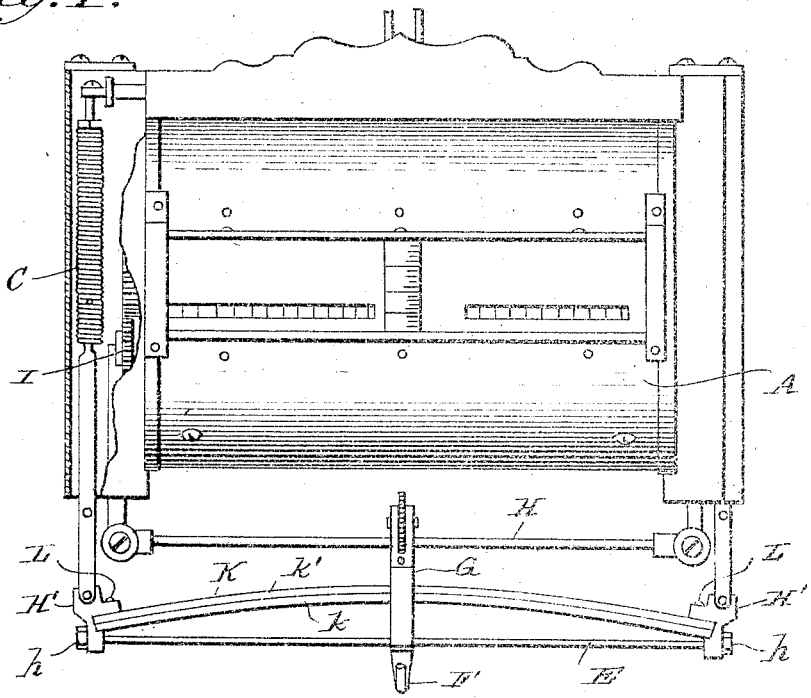
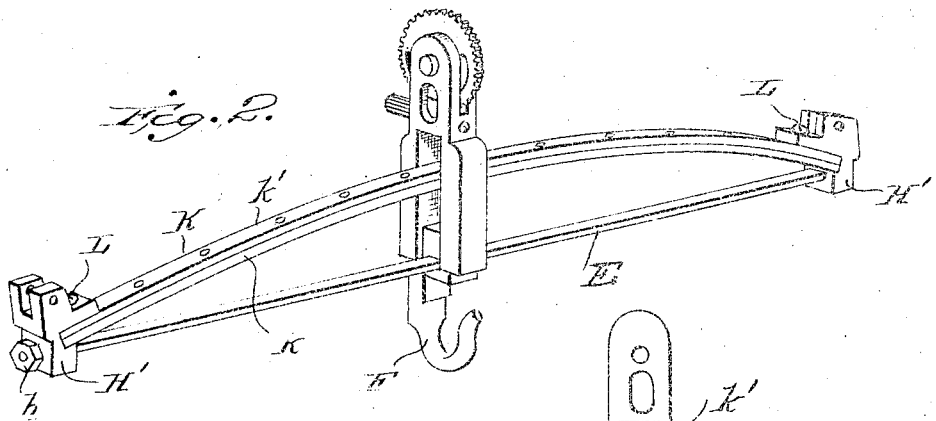
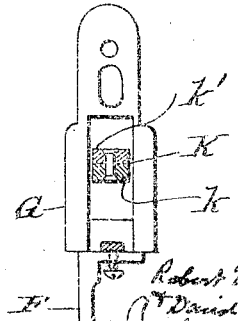

UNITED STATES PATENT OFFICE.

ALBERT N. OZIAS, DECEASED, LATE OF MINNEAPOLIS, MINNESOTA, BY DAVID L. FAIRCHILD AND ROBERT VAN LOAN HAXBY, ADMINISTRATORS, OF MINNEAPOLIS, MINNESOTA.

SPRING-BALANCE SCALE.

1,092,449.   Specification of Letters Patent.   Patented Apr. 7, 1914.

Application filed July 3, 1912. Serial No. 707,591.

*To all whom it may concern:*

Be it known that ALBERT N. OZIAS, deceased, late a citizen of the United States residing at Minneapolis, in the county of Hennepin and State of Minnesota, did invent certain new and useful Improvements in Spring-Balance Scales, of which the following is a full, clear, and exact description, reference being had to the accompanying drawings, forming part of this specification, and to the figures and letters of reference marked thereon.

This invention relates to scales of that type in which the load is counterbalanced by a spring or springs, one object of the invention being to provide a construction in which the effect of variations in temperature on the counterbalancing mechanism will be neutralized or overcome automatically and the scales caused to give a correct indication of weight at any prevailing temperature.

Another object of the invention is to provide a mechanism which will automatically compensate for or neutralize the variations due to temperature changes throughout a wider range of temperatures than has heretofore been deemed practical and to simplify and cheapen the cost of the mechanism whereby the invention may be applied to scales for popular use without materially increasing the cost of the same.

The invention in the form adopted for illustrative purposes is primarily adapted for use in connection with so-called computing or price scales, and referring to the accompanying drawings, Figure 1 is a front elevation of a price scale having the present invention embodied therein, portions of the structure being broken away to show underlying parts; Fig. 2 is a perspective view of the preferred form of controlling or compensating mechanism; and Fig. 3 is a cross section through the part of the device illustrated in Fig. 2, and which, as a whole, is commonly designated a "hook bar."

Like letters of reference in the several figures indicate the same parts.

Generally speaking, the scale illustrated is one of a well known type now in extensive public use and embodies in its construction a casing A within which there is journaled a drum having upon its periphery suitable indications of value and weight which are displayed through a sight opening in the casing. At each end of the casing counterbalancing springs C of the usual coil tension type are suspended, and in turn are connected at their lower ends with the bottom bar or member, commonly designated as the "hook bar." In accordance with the present invention, this hook bar is a compound member embodying a tension member E to an intermediate portion of which the hook or load support F is connected in any suitable manner and said load support or hook is, through the frame G, transverse rod H and rack bars I meshing with pinions on the ends of the drum, adapted to rotate the drum in proportion to the downward movement of the load support. The tension member E constitutes in effect a portion of the counterbalancing springs and will be deflected centrally in proportion to the weight of the load carried by the load support. It is preferably of tempered metal and, of course, roughly proportioned to the capacity of the scale, but its deflection is in the present instance adapted to be controlled and regulated in accordance with the prevailing temperature by a thermostatic member formed of metal having different co-efficients of expansion, and so assembled and connected therewith that upon a rise in temperature the member E will be put under increased tension, thereby increasing its resistance to deflection, and so neutralizing the effect of the rise in temperature upon the action of the main counterbalancing springs C. As illustrated, the ends of the member E are anchored in blocks or cap pieces H' preferably by adjusting nuts $h$, and these end or cap pieces H' also serve as the anchors for the opposite ends of an arc-shaped bi-metallic thermostat member K preferably having its concave side formed of a metal with a high co-efficient of expansion and its convex side of a metal with a low co-efficient of expansion. Conveniently, the member is formed by firmly connecting, as by rivets, at frequent intervals, a brass bar $k$ and a steel bar $k'$, although the latter may be of invar or some alloy having an exceedingly low co-efficient of expansion.

In anchoring the ends of the bi-metallic member, they are preferably seated in recesses in the cap pieces and secured firmly in place by screws L, although it will be understood that the particular connecting arrangement between the ends of the bi-metallic and tension member E is not particularly important, if care be taken to make the connection sufficiently rigid to prevent any looseness between the parts such as will cause an irregularity in the action of the scale.

In assembling the mechanism, it is preferred that the member E which may be conveniently termed a chord member be substantially straight and under considerable initial tension, while the bi-metallic or thermostatic member is preferably bowed to a considerable extent. With this construction, the practical result is that the chord member has its tension varied in accordance with the variations in temperature, such tension increasing as the temperature rises and decreasing as the temperature lowers, due to the fact that the metal having a high co-efficient of expansion tends to straighten the arc-shaped bi-metallic member as the temperature rises, but inasmuch as no straightening can occur, owing to the ends of the bi-metallic member being anchored to the chord member, the result is to greatly increase the tension of the chord member and the range of variation in temperature through which the device will operate to effectually neutralize the variation in the action of the main counterbalancing spring is greatly increased.

Not only does the device respond quickly to changes in temperature, but it adapts itself to the load being weighed and is not liable to become set or strained by an overload; thus it may be used on scales of large capacity, without danger of destroying their accuracy for weighing in small increments.

Having thus described the invention what is claimed as new is:

1. In a scale, the combination with a counterbalancing spring tension member, an indicator, and a load support connected with the indicator and with the spring tension member intermediate its ends, of a curved bi-metallic thermostat member having its ends rigidly connected with the ends of said spring tension member to increase the longitudinal tension of said tension member and its resistance to deflection as the temperature rises.

2. In a scale, the combination with indicating mechanism, a load support operatively connected with the indicating mechanism and a counterbalancing spring tension member adapted to be deflected transversely by the load, of a curved bi-metallic member anchored at its ends to the ends of the spring tension member, said bi-metallic member being formed of a metal having a high co-efficient of expansion on the concave side, and a metal having a low co-efficient of expansion on the convex side.

3. In a scale, the combination with indicating mechanism, a load support operatively connected with the indicating mechanism and a substantially straight counterbalancing spring tension member adapted to be deflected transversely intermediate its ends, of a curved bi-metallic member anchored at its end to the ends of the counterbalancing spring tension member, said bi-metallic member being formed of metals having different co-efficients of expansion with the metal having the higher co-efficient of expansion on the concave side, whereby the counterbalancing spring tension member is put under increased longitudinal tension as the temperature rises.

4. In a scale, the combination with indicating mechanism, a counterbalancing spring system embodying coil springs and a straight tension member spring and a load support carried by the tension member intermediate its ends and operatively connected with the indicating mechanism, of a curved bi-metallic thermostat bar rigidly connected at opposite ends with opposite ends of the tension member, the metal of the thermostat bar having the higher co-efficient of expansion being located on the concave side of the bar.

5. In a spring balance scale, the combination with two suspended coil springs and an indicator, of a hook bar suspended from said coil springs and embodying a substantially straight tension member and a curved bi-metallic member formed of metals having different co-efficients of expansion, a load support carried by said tension member intermediate its ends and connections intermediate the load support and indicator.

6. In a spring balance scale, the combination of an indicator, counterbalance springs and a hook bar suspended from said springs and embodying a deflectable chord member, an arc-shaped bi-metallic member rigidly connected at its ends with the ends of the chord member, and a load support carried by the chord member intermediate its ends with connections intermediate the load support and indicator.

7. In a spring balance scale, the combination with parallel counterbalance springs suspended from their upper ends and an indicator, of a hook bar suspended from the counterbalance springs and operatively connected with the indicator, said hook bar embodying a yielding chord member and a bi-metallic arc member, rigidly connected at its ends with the ends of the chord member, said arc member being formed of metals having different co-efficients of expansion and with the metal having the higher co-efficient of expansion on the concave side.

DAVID L. FAIRCHILD.
ROBERT VAN LOAN HAXBY.

*Administrators of the estate of Albert N. Ozias, deceased.*

Witnesses:
JOHN C. BENSON,
H. C. MACKALL.